April 28, 1936. F. C. REILLY ET AL 2,039,187
BRAKE
Filed April 8, 1933 3 Sheets-Sheet 1

INVENTORS
Frank C. Reilly
Joseph W. Jones
ATTORNEY

UNITED STATES PATENT OFFICE 2,039,187

BRAKE

Frank C. Reilly and Joseph W. Jones,
New York, N. Y.

Application April 8, 1933, Serial No. 665,068

19 Claims. (Cl. 188—78)

Our invention relates to brakes and refers particularly to brakes of the expanding type, and also to brakes which utilize the drag of the brake drum for increasing the braking effect, and refers more particularly to brakes having separate independently removable and replaceable brake blocks. The brake device of our invention is especially well adapted for use on automobiles, but is not restricted to such use.

The brakes of an automobile are a constant source of danger and also give a great deal of trouble, annoyance and expense to the motorist of the modern car. The wheel brakes most generally in use and considered the best so far available, in spite of their many defects, are of the expanding type, having a pair of brake shoes which are pivoted at one end so that they may be forced apart at the other, commonly by means of a lever, sometimes having a cam, or in the case of hydraulic brakes, by means of what is known as a "wheel cylinder." With such a construction, it is obvious that the braking pressure brought to bear against the inside of the brake drum is unequal along the length of the brake shoes, and that wear upon the braking material or "brake lining" is likewise unequal. With ordinary usage frequent adjustments are required, as well as rather frequent renewals of the brake lining, both of which are commonly inconvenient and troublesome.

Another defect in such a usual construction, having a pair of pivoted brake shoes to be expanded against the inner circumferential surface of a rotatable brake drum, is that the circumferential braking surface of the shoes against the drum is relatively small, at most commonly amounting to not more than about two-thirds of the circumferential braking surface of the drum, so that thus much available braking surface is not used. Also, in many instances, through slight inaccuracies in construction, or in assembling, or from the braking strain, the braking surface of the rotatable drum is not exactly concentric with its axis of rotation, which manifestly results in an uneven or unequal braking effect which takes place during each rotation of the drum, due to the eccentricity of the drum relative to its axis of rotation. Even if the drum is absolutely true, the mounting of the brake shoes relatively thereto must be extremely accurate, otherwise there will be further inequality of braking pressure and wear upon these shoes.

Furthermore, in any case, with such pivotally mounted brake shoes, the braking drag of the rotating drum thereon, while it will somewhat increase the pressure and braking effect of one of these shoes, will at the same time loosen the other shoe so as materially to decrease its pressure against and braking effect upon the rotating drum, thereby resulting in the major part of the braking being done by one shoe only, thus by one of them when the drum rotates in one direction and by the other shoe when the drum rotates in the other direction.

It is the general object and purpose of our invention to provide a brake which is free from the above noted, as well as other, defects and objections. Other objects of our invention are to provide such a brake which is altogether reliable, eminently effective, strong, durable, dependable, readily kept in operative condition, not liable to fail, inexpensive in upkeep and economical to manufacture. Other more particular objects and advantages of our invention will hereinafter appear.

The brake device of our invention brings braking pressure to bear radially against the brake drum throughout the combined length of all of the braking elements employed. Such braking pressure is brought to bear upon the inner annular braking surface of the brake drum almost completely throughout its circumferential extent, there being only one small gap not thus utilized. The construction is such that the braking elements adjust themselves automatically to any lack of trueness of the drum, whether it be a departure from a true circle, or that its annular braking surface may be eccentric to its axis of rotation. Furthermore, the drag of the drum upon the braking elements induces a self-energizing effect upon all of such elements by which the applied braking pressure is augmented automatically, in a similar manner in either direction of rotation of the brake drum. The brake device of our invention has yet other desirable attributes, as will hereinafter appear.

In carrying out the ideas of our invention in a practicably workable construction, an extended arcuate series of separate, and in some respects independent, brake blocks are employed in circumferentially endwise abutting relation with one another. Such blocks may be maintained in place and guided for braking movement within a radially open stationary channel-shaped housing, provided on a mounting plate or the like, or by other suitable retaining and guiding means. The abutting ends of these brake blocks are shaped to interengage in interlocking relation with one another, each with its neighbor at its opposite ends, thereby to maintain their peripheral braking surfaces in circumferential alignment.

A stationary abutment block, or other suitable abutment member, fixed to the mounting plate, is interposed between the end blocks of the continuous series of brake blocks. Suitable spring-actuated retractile means are provided which normally, or in the released condition of the brake, are adapted to maintain the brake blocks out of frictional engagement with the brake drum and with the end blocks of the series abutting against the abutment block, or the like, at opposite sides of the latter. The brake is applied by forcing the terminal blocks in the series of brake blocks away from one another, thereby radially expanding the entire continuous series of abutting blocks into frictional engagement with the inner annular braking surface of the rotatable drum. The braking torque applied by the rotating brake drum, in either direction of its rotation, to the brake blocks will push each of these blocks more strongly against the next following block in the continuous series and thus will automatically substantially augment the braking effect.

Desirably the means employed for thrusting the terminal brake blocks apart is so constructed as to permit one of these end blocks to remain in abutting relation with the interposed abutment block while the other end block is moved away from the abutment block by the frictional braking torque which is applied to all of the brake blocks in the series thereof, the terminal brake block which is thus moved away from the abutment block being determined by or dependent upon the direction of rotation of the brake drum. A suitable special form of cam may be thus employed for directly thrusting the terminal brake blocks apart in the manner above noted. In a hydraulic braking system, a wheel cylinder may be similarly directly employed. In carrying out our invention, either a suitable rotatable eccentric cam or a hydraulic cylinder may be combined with a specially constructed intermediary toggle linkage through which the terminal brake blocks are thrust apart in the desirable manner above noted, according to which one of such brake blocks may continue in abutting relation with the interposed stationary abutment block while the other terminal brake block is moved away therefrom by the braking torque.

In all forms of our invention, the construction is such that the amount of force required to be used in applying the brake is substantially the same whether the brake drum is rotating in one direction or the other. Also, in each instance, the brake-applying force is free to act and to be fully utilized. Such force is not opposed by the frictional drag of the rotating brake drum, as heretofore has been the case in some brake constructions, particularly in those of the self-energizing or servo type.

The braking device of our invention further includes various features of construction and combinations of parts, as will appear from the following description.

The accompanying drawings illustrate several modified embodiments of our invention, together with modified variations in some of the features thereof, and the brake of our invention will now be further and more particularly described with reference to such drawings, in which similar reference numbers refer to similar parts and in which:

Figure 7 is a broken vertical section on the horizontal line 7—7 of Figure 6, similar to the upper part of Figure 1.

The form of the automobile brake device which is illustrated in Figures 1 to 5 inclusive of the accompanying drawings will be first described. A rotatable brake drum 21 is shown as fixedly secured, by means of bolts 22, to an automobile wheel 23, to be rotated thereby. A stationary mounting plate 24 is fixedly secured, by means of a spider bracket member 25, to an axle housing 26. A long arcuate substantially Z-shaped flange member 27 has its inner flange firmly secured to the mounting plate 24, by means of rivets 28, with its web and radially outer flange forming, together with the peripheral portion of the mounting plate 24, a peripherally open channel inwardly from the annular braking surface of the brake drum 21. A gap or open space is provided between the ends of this channel-forming flange member 27 at the top. A relatively small rectangular abutment block 29 is rigidly secured, by means of a screw 30, together with a pair of dowel pins 30A, 30A, to the upper peripheral portion of the mounting plate 24, above the gap provided between the ends of the flange member 27 and in circumferential alignment with the channel formed thereby within the annular braking surface of the rotatable drum 21.

Figure 1:
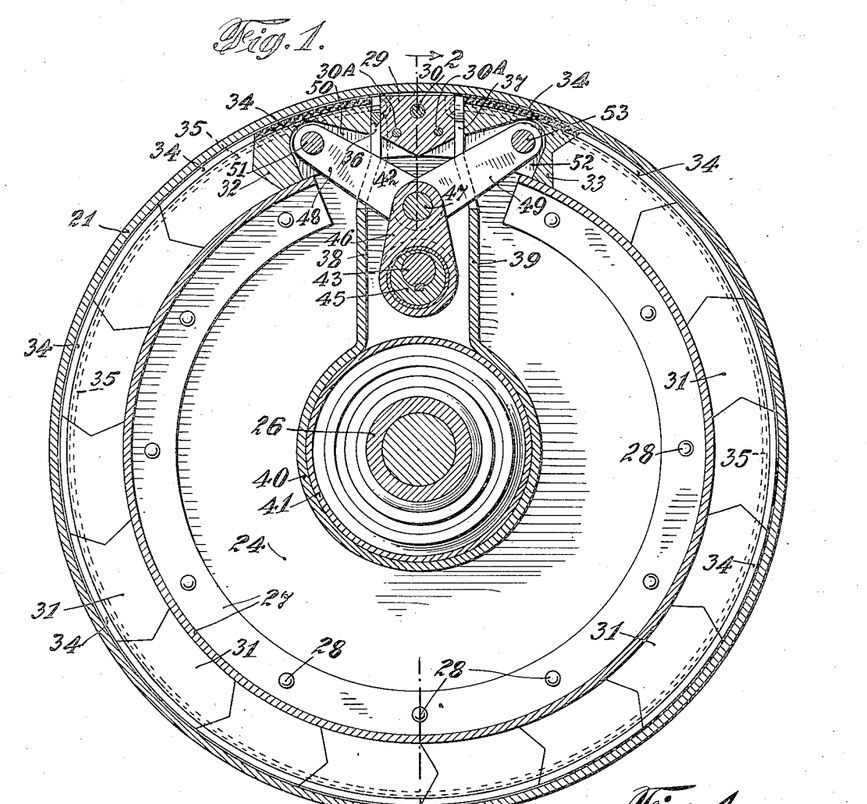
Figure 1 is a vertical section on the line 1—1 of Figure 2, with some parts shown in elevation, showing one form of automobile brake constructed in accordance with our invention, the released condition of the brake being indicated by the positions of its operating parts or elements.
Figures 1, 2, 5, 6, 8, 9:
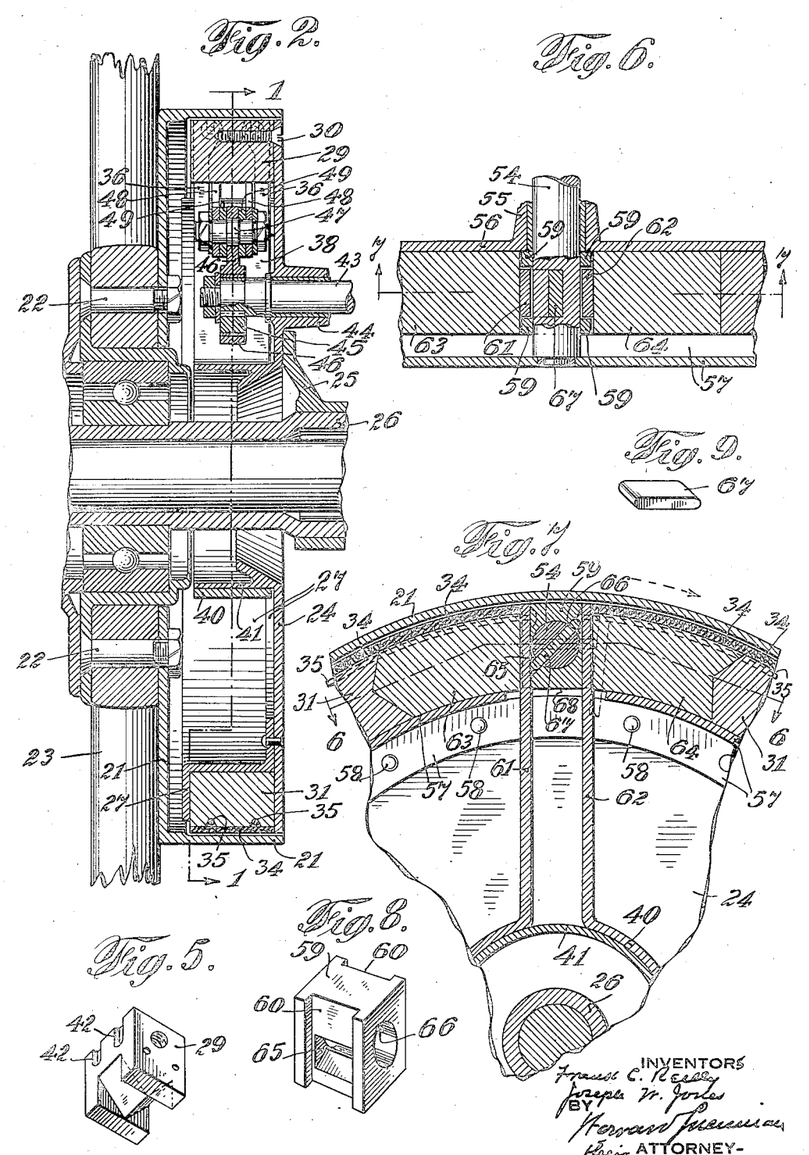
Figure 2 is a transverse vertical section on the line 2—2 of Figure 1, parts of the automobile wheel appearing in this view.
Figure 5 is a perspective view of an abutment block which appears at the top in Figures 1 to 4 inclusive, as there fixed upon a stationary mounting plate.
Figure 6 is a broken transverse and in part horizontal section on the bent line 6—6 of Figure 7, showing a modified form of our invention.
Figure 8 is a perspective view of an abutment block which appears at the center of Figure 6 and at the top in Figure 7.
Figure 9 is a perspective view of a rotatable and slidable brake-operating cam member which appears in section in Figures 6 and 7.

A continuous extended arcute series of separate and virtually independent circumferentially curved similar brake blocks 31, 31 are movably contained in mutually endwise abutting relation in the channel formed by the flange member 27 with the mounting plate 24. This series further includes two substantially similar specially constructed terminal brake blocks 32 and 33, at the top. Each of these brake blocks 31, 31, 32 and 33 carries an outer facing 34 of braking material which is firmly secured thereto. These brake blocks have, at their abutting ends, complementary interengaging surfaces which interlock along radial lines. In the particular construction shown, the abutting end surfaces of the brake blocks are shown as being of a wide V-shape, so that one of the ends of any one of the intermediary blocks 31, 31 has therein an obtuse reentrant angle while its other end presents an obtuse salient angle, the ends of each such block having interfitting relation with its adjacent neighbors, the end blocks 32 and 33 having respectively a similar interfitting relation with the next adjacent blocks 31, 31.

The braking surfaces of the facings 34, 34 on the brake blocks 31, 31, 32 and 33 are normally, when the brake is in a released condition, held out of frictional engagement with and in slightly inwardly spaced relation from the brake drum 21 by means of a pair of sufficiently flexible encircling band wires 35, 35, which are respectively seated in peripheral grooves in the blocks 31, 31, 32 and 33 at the inner sides of the facings 34, 34, and which also serve to prevent the brake blocks 31, 31 from dropping out should the wheel 23 be removed. These retracting and retaining wire bands 35, 35 have headed ends which are hooked into slotted notches in the ends of the forks 36, 36 and 37, 37 provided respectively by the bifurcated upper end portions of a pair of laterally spaced substantially similar upstanding leaf-spring arms 38 and 39 which are shown as formed in one piece and as joined together and supported by a circularly curved connecting band portion 40 which passes around a flanged internal boss 41 formed on the mounting plate 24.

The interposed abutment block 29 has therein recesses 42, 42 for the reception of the heads of the wire bands 35, 35. In the unapplied or released condition of the brake, the two pairs of forks 36, 36 and 37, 37 of the respective spring arms 38 and 39 abut against the opposite sides of the interposed abutment block 29. The spaced opposed ends or the terminal brake blocks 32 and 33 abut respectively against the pair of forks 36, 36 and 37, 37, so that thus, in this particular construction, these terminal brake blocks 32 and 33 abut against the interposed abutment block 29 through the intermediary of these forks 36, 36 and 37, 37.

A brake-operating shaft 43 passes through the upper part of the mounting plate 24, being spaced below the abutment block 29, in a central vertical plane, and is journaled in a bearing boss 44 formed on this mounting plate. The inner end of the operating shaft 43 has an eccentric cam 45 fixed thereon, to be operated by rocking movement imparted to the operating shaft 43. The eccentric 45 engages within a bearing in the lower end of an upwardly extending thrust link 46. The upper end of this thrust link 46 carries a pivot pin 47 which projects from the opposite sides thereof. It will be noted that the operating shaft 43, its eccentric 45 and the thrust link 46 are all disposed in the space between the upstanding spring arms 38 and 39. A pair of toggle links 48, 48 are pivoted upon the outer end portions of the pivot pin 47, and a similar pair of toggle links 49, 49 are pivoted on this pivot pin 47 adjacently to the thrust link 46. Thus these two pairs of toggle links are pivoted together and to the upper end of the thrust link 46 by means of the pivot pin 47.

The pair of toggle links 48, 48 extend laterally outward at an upward inclination from the pivot pin 47 and have their outer ends pivoted to the terminal brake block 32 in a recess 50 therein, by means of a removable pivot pin 51. The other pair of toggle links 49, 49 similarly extend laterally outward, in the opposite direction, at an upward inclination and have their outer ends pivoted to the other terminal brake block 33, in a recess 52 therein, by means of a removable pivot pin 53. The toggle links 48, 48 pass between the spaced forks 36, 36 of the leaf-spring arm 38, while the other toggle links 49, 49 similarly pass between the spaced forks 37, 37 of the other leaf-spring arm 39.

The operation of the above described automobile brake device of our invention is as follows:—

Figures 1 and 2 show the released or unapplied condition of the brake, in which the toggle-operating cam eccentric 45 is turned directly downward, with the brake blocks 31, 31, 32 and 33 withdrawn radially inward to the maximum extent away from the braking surface of the rotative brake drum 21, such withdrawal being sufficient to assure clearance, which in the brake device of our invention will be uniformly the same for all of the brake blocks, as well as also along the length of each of these brake blocks individually, as may be noted from Figures 1 and 2. In this particular construction, with the position of the operating parts as shown in Figure 1 and 2, the eccentric 45 will co-operate with the spring arms 38 and 39 in maintaining the brake blocks 31, 31, 32 and 33 at their non-operative position. The encircling band wires 35, 35 are drawn snugly around these brake blocks by the spring forks 36, 36 and 37, 37, which are shown as abutting the opposite sides of the abutment block 29 and as in turn abutted by the terminal brake blocks 32 and 33.

Figure 3:
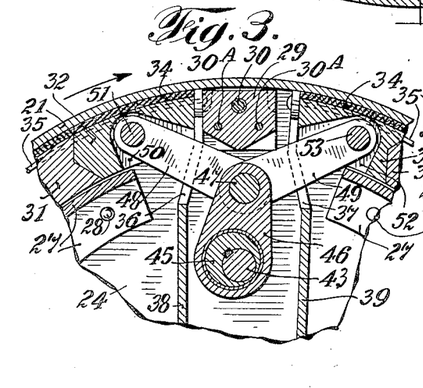
Figure 3 is a broken vertical section similar to the upper part of Figure 1, showing the positions assumed by the operating elements or parts when the brake is applied or set with the brake drum rotating in a clockwise direction, as there indicated by the arrow.
Figure 4:
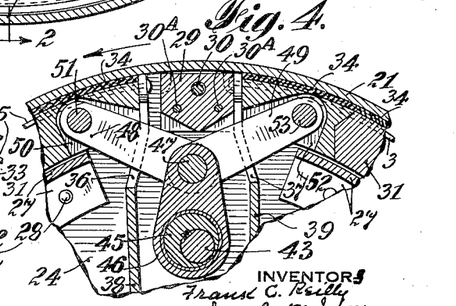
Figure 4 is a similar view showing the positions of the operating parts with the brake drum rotating in the opposite direction.

The brake may be applied, or set, to whatever extent desired by means of a usual brake pedal (not shown) having substantially usual or any suitable operating connections to the brake-operating shaft 43, for rotatively rocking the latter, which of course carries with it the toggle-operating eccentric 45. In Figures 3 and 4 this eccentric 45 is shown as thus rocked in a clockwise direction, with the brake in an applied condition, the brake facings 34, 34 of the brake blocks 31, 31, 32 and 33 being shown as in frictional braking engagement with the annular braking surface of the brake drum 21 and with the inner faces of these brake blocks shown as correspondingly slightly spaced radially outward away from the web portion of the channel-forming flange member 27.

The camming action of the eccentric 45, when it is thus rotated, imparts a powerful outward and substantially radial thrust to the thrust link 46, the force of which is multiplied and augmented by the spreading pairs of toggle links 48, 48, and 49, 49. The latter thus transmit and apply a powerful spreading force, almost equally, to the terminal brake blocks 32 and 33, which moves these blocks farther apart or away from one another. Should this braking force be applied while the brake drum is stationary, that is, with the automobile at rest, it is obvious that the terminal brake blocks 32 and 33 would be thus moved, together with the spring forks 36, 36 and 37, 37, to a substantially equal extent away from the interposed abutment block 29.

It is to be noted that the upwardly extending thrust link 46 is free to swing in either lateral direction, by pivotal movement upon its actuating eccentric 45, irrespective and independently of the rotative movement or position of the latter. This construction is utilized for securing an augmented braking resistance automatically when the brake drum 21 is rotating in either one direction or the other, as well as other advantageous results in operation. For example, with the brake drum 21 rotating in the clockwise direction indicated in Figure 3, with the brake applied, as there shown, the frictional drag of the drum 21 upon all of the brake blocks 31, 31, 32 and 33 will exert a strong force tending to shift all of these brake blocks circumferentially in the same clockwise direction. This force is unopposed, excepting by the abutment block 29.

Thus the thrust link 46 freely swings to the right and the terminal brake block 33 moves away from the abutment block 29 while the other terminal block 32 remains in abutting relation therewith. The result is that this dragging force of the brake drum 21 thrusts the brake blocks throughout the series just that much more strongly against each other, thereby creating a resultant radially expansive force which is applied by the brake blocks, throughout the series thereof, to the braking surface of the rotating drum 21. This, of course, is in addition to the similar expansive force created by the freely laterally shiftable pairs of toggle links 48, 48 and 49, 49 and similarly applied by the brake blocks to the brake drum 21. It will now be clear that the entire force resulting from the drag of the brake drum 21 is borne by the stationary abutment block 29, with none whatever of this strain coming upon the toggle links 48, 48 and 49, 49, or other movable operating parts.

In the example shown in Figure 4, with the brake drum 21 rotating in the counter-clockwise direction there indicated, it will be noted that the thrust link 46 has pivotally shifted or swung towards the left, that the right-hand terminal brake block 33, together with the pair of spring forks, 37, 37, remains in abutting relation with the stationary abutment block 29, and that the other terminal brake block 32, with the other pair of spring forks 36, 36, is spaced from the other side of the abutment block 29. The manner of operation and the final result are substantially the same as above described with reference to Figure 3.

When the brake is in a released condition, as shown in Figures 1 and 2, the peripheral curvature of the arc of the braking surfaces of the brake block facings 34, 34 is slightly less than the circular curvature of the annular braking surface of the brake drum 21, and when the brake is applied, as shown in Figures 3 and 4, these two curvatures are the same, being that of the braking surface of the drum 21. In this slight radial change in position of the brake blocks 31, 31, 32 and 33, as they are moved circumferentially, their abutted interengaged or interlocked ends will pivot ever so little upon each other, while still maintaining these brake blocks in arcuate alignment, with their facings 34, 34 in effective frictional braking engagement with the braking surface of the rotatable drum 21.

When the brake block facings 34, 34 have become sufficiently worn they may be conveniently renewed. First the brake drum 21 and the mounting plate 24 are separated, such as by removing the wheel 23 together with the drum 21, in the particular example shown. Now the pivot pins 51 and 53 may be removed and the headed ends of the band wires 35, 35 lifted out of the slotted notches in the upper ends of the pairs of forks 36, 36 and 37, 37 of the respective spring arms 38 and 39. This will free the entire continuous series of brake blocks 31, 31, 32 and 33 from the mounting plate 24 and from its channel-forming flange member 27, so that thus all of these brake blocks, together with their band wires 35, 35, may be removed as a unit and spread out upon any conveniently available surface.

Any of the brake facings 34, 34 which require to be renewed may be simply torn off from the brake blocks by which they were carried, whereupon new facings 34, 34 may be attached to such brake blocks. In some instances at least, it may be found convenient to renew some of the facings 34, 34 without removing the series of brake blocks from the mounting plate 24. Also, should it be eventually required, new brake blocks may be readily substituted for old ones, these blocks being relatively inexpensive.

In the modification shown in Figures 6 to 9 inclusive, a rotatively rocking operating shaft 54 is journaled in a boss 55 on the outer side of a stationary mounting plate 56 and has a reduced end portion journaled in the free radial flange of a channel-forming flange member 57 having its inturned flange secured to the mounting plate 56 by rivets 58, 58. A rectangular stationary abutment block 59 is mounted upon the shaft 54, which may rock therein. This abutment block has similar vertical channels 60, 60 in its opposite lateral sides, in which the upper end portions of upstanding leaf-spring arms 61 and 62 are normally respectively seated. The spaced opposed ends of terminal brake blocks 63 and 64 normally abut respectively against the springs 61 and 62 and also against the flanges on the abutment block 59 formed by its channels 60, 60.

The abutment block 59 has outwardly flaring holes 65 and 66 respectively through its opposite lateral sides. The hole 65, at the left side, provides an upper horizontal stop wall and a lower downwardly and outwardly inclined stop wall, while the other hole 66 provides an upper upwardly and outwardly inclined stop wall and a lower horizontal stop wall, as shown more particularly in Figures 7 and 8. The operating shaft 54 carries a flat rectangular transversely elongated cam element 67, having rounded ends. This shaft, as shown in Figures 6 and 7, has a longitudinally slotted hole diametrically through it, through which the cam 67 passes with a sliding fit, with its ends projecting beyond the shaft into the openings 65 and 66 and into operative engagement with the adjacent faces of the leaf springs 61 and 62. In this instance the flange member 57 may be annular, as indicated by its continuous flanges in Figures 6 and 7, its web portion being provided with an opening 68 through it for the spring arms 61 and 62 and of sufficient length to permit these spring arms to be moved away from the interposed stationary abutment block 59.

The operation is as follows:—

Figures 6 and 7 show the normal position of the operating parts, in which the brake block facings 34, 34 are out of engagement with the braking surface of the drum 21. The cam element 67 is then at an inclination and stopped against the inclined faces of the openings 65 and 66 in the abutment block 59. Should the operating shaft 54 be rotated, the rounded ends of the cam element 67 will thrust the spring arms 61 and 62 apart, the maximum of such separation being reached when this cam is disposed horizontally, where it then will abut against the horizontal faces of the openings 65 and 66 in the abutment block 59, as is shown by broken lines in Figure 7.

With the brake drum 21 rotating, for example, in a clockwise direction, as indicated, the spring arm 61 and the terminal brake block 63, at the left, will remain in abutment with the abutment block 59, while the braking drag of the drum 21 will carry the other spring arm 62 and terminal brake block 64 towards the right and away from the stationary abutment block 59, the cam element 67 then freely sliding through the operating shaft 54, all as clearly shown in broken lines in Figure 7. Should the brake drum 21 be rotated in the opposite direction, it is obvious that the right-hand spring arm 62 and terminal brake block 64 would then continue to abut against the abutment block 59, while the other spring arm 61 and terminal brake block 63 would be moved away from the abutment block 59, with a corresponding sliding movement of the cam element 67 in the opposite direction, or towards the left. In other respects than above noted, the operation is the same as in the first described construction.

Figure 10:
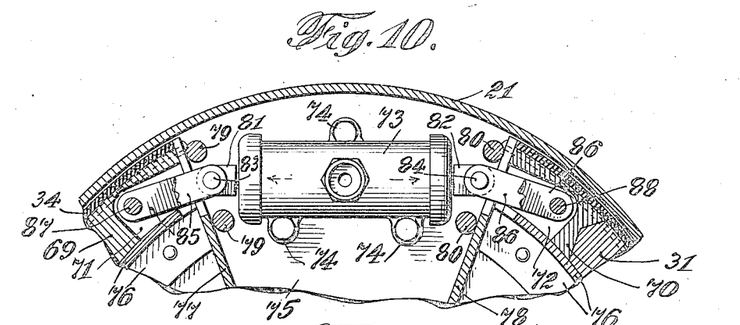
Figure 10 is a broken vertical section, similar to the upper part of Figure 1, showing a modified form of our invention adapted for hydraulic brakes.

The modification shown in Figure 10 is one example of the adaptation of the brake device of our invention to a hydraulic brake system. In the particular construction illustrated, terminal brake blocks 69 and 70, having recesses 71 and 72 respectively therein, are shown as sufficiently widely spaced to accommodate between them a horizontally disposed hydraulic cylinder 73, which is shown as firmly secured by means of three bolts 74, 74, 74 to a stationary mounting plate 75, which carries a channel-forming flange member 76.

Retractile leaf springs 77 and 78 are bifurcated at their upper ends to provide forks, as in the first described construction, and as indicated in Figure 10. Two pairs of abutment lugs 79, 79 and 80, 80 are shown as provided on the mounting plate 75 as abutments for the respective springs 77 and 78, and thus serve as backing stops for the terminal brake blocks 69 and 70. Opposed piston rods 81 and 82 of the cylinder 73 are respectively connected, by means of pivot pins 83 and 84, pairs of thrust links 85, 85 and 86, 86, and pivot pins 87 and 88, with the terminal brake blocks 69 and 70. The operation in general is substantially the same as in the previously described constructions.

Figures 11, 12, 13, 14, 15, 16:
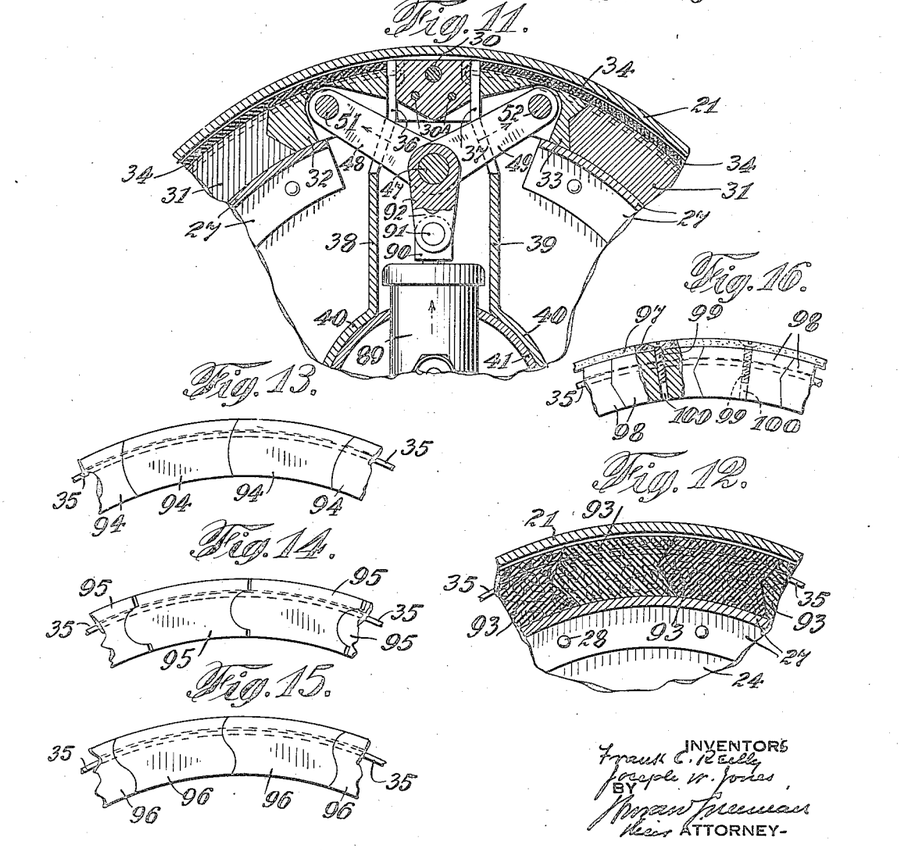
Figure 11 is a similar view showing another modification adapted for use in a hydraulic brake system.
Figure 12 is a similar view of a modification in which the brake blocks are formed throughout of braking material.
Figure 13 is a broken detail side elevation showing brake blocks of a modified shape.
Figure 14 is a similar view showing brake blocks of another modified shape.
Figure 15 is a similar view showing brake blocks of another different modified shape.
Figure 16 is a similar view of a modification in which a single continuous facing band of braking material is secured to each of the brake blocks throughout the series thereof.

Figure 11 shows a modification in which a vertically disposed hydraulic cylinder 89 has an upwardly projecting piston rod 90 carrying a pivot pin 91 which pivotally carries the lower end of an upwardly extending thrust link 92, the upper end of which carries the pivot pin 47, referred to in the first described construction, with the thrust link 92 functioning in a manner similar to the thrust link 46. All of the remaining co-operating operating parts and features shown in Figure 11 are of substantially the same construction as shown in Figures 1 to 5 inclusive. The operation of this modification thus will be substantially similar to that of the first described construction.

Figure 12 shows a modification in which brake blocks 93, 93 consist entirely of braking material throughout. Such blocks may be molded of suitable material.

Figures 13, 14 and 15 show different modified shapes which the interengaging interlocked ends of the brake blocks 94, may have. The brake blocks 94 shown in Figure 13 abut with each other along complementary arcuate curves, the opposite ends of such curves being disposed in radial planes. The abutted ends of the brake blocks 95, 95 shown in Figure 14 have a jointed pivotal abutting relation with one another, one end of any one brake block 95 being shown as provided with a substantially semi-circular projection which fits into a complementary arcuate recess in the other end of the next brake block. In Figure 15 the modified brake blocks 96, 96 abut along ogee or substantially S-shaped curved surfaces which are complementary with respect to the abutting ends of the blocks and which are shown as having their ends disposed in radial planes.

Figure 16 shows a modification in which a continuous unbroken band 97 of braking material extends peripherally around and forms a facing for a continuous arcuate series of brake blocks 98, 98. This single continuous brake facing 97 is shown as secured to the successive brake blocks 98, 98 in the continuous series thereof by means of drive screws 99, 99 seated in holes 100, 100 which extend radially through the brake blocks 98, 98, thus providing for driving out these screws when the brake facing band 97 is to be renewed. The construction and operation of the brake device as a whole may be substantially the same as any of those hereinbefore described with reference to preceding figures.

In all of the described constructions, the series of brake blocks is expanded radially outward into braking engagement with the braking surface of the rotatable brake drum. The braking action is caused by forcing the brake blocks toward each other along the arc occupied by these brake blocks.

The terminal brake blocks of the series are thrust away from each other along the short arc or segment of the circle in which they are disposed, which will be toward each other along the longer arc of the circle occupied by the brake blocks, thus to expand the arcuate series of brake blocks by creating a radial component of movement and braking pressure of all of the brake blocks in the series.

Thus it will be understood that if any two objects, such as the terminal blocks, referred to, or in fact any of the brake blocks, should be thrust or moved concomitantly relatively in opposite directions, in a circular or annular path, these blocks will move away from each other in one portion or segment of the circle and at the same time will move toward each other in the other or opposite portion or segment of the circular path of their movement.

In claiming the invention, some of the claims define a construction by means of which a separating thrust is applied to the terminal brake blocks, while other claims set forth that a terminal block is thrust toward the abutment block along the arc occupied by the brake blocks, thus moving the brake blocks toward each other along this latter arc.

It will now be clearly evident that these different expressions are in conformity and that the manner of operation is similar in each instance.

It is obvious that various modifications may be made in the constructions shown in the drawings and above particularly described, within the principle and scope of our invention as defined in the appended claims.

While the brake device of our invention is of particular advantageous utility in connection with automobiles, it is obvious that it is well adapted to other uses in general.

We do not limit ourselves specifically to size, shape, proportions, materials, or specific features, as illustrated in the accompanying drawings and particularly described, these being given simply as a means for clearly describing the device of our invention.

What we claim is:—

1. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks of said series spaced apart in opposed relation, a stationary abutment block interposed between said spaced terminal blocks and forming thrust stops therefor, and operating means for said series of brake blocks comprising an operating member adapted to transmit movement in a radially outward direction with respect to the axis of rotation of said drum, an outwardly extending thrust link pivoted at its inner end to said operating member to be moved outwardly thereby, and a pair of co-operating toggle links pivoted at their adjacent inner ends to the outer end of said thrust link and having their outer ends respectively in pivotal thrusting engagement with said terminal blocks thereby to expand said series of brake blocks radially into frictional braking engagement with the annular braking surface of said drum and so that by reason of the freedom of each of said terminal blocks to move away from said abutment block while the other terminal block remains in abutted relation therewith the rotation of said drum will automatically increase the frictional braking resistance throughout said series of brake blocks with the braking surface of said drum irrespective of the direction of rotation of said drum.

2. In a brake construction, in combination, a rotative brake drum having an internal annular braking surface, a stationary mounting plate concentric with said drum, a stationary peripherally open channel fixedly carried by said mounting plate and disposed inwardly from the annular braking surface of said drum, a stationary abutment block fixedly carried by said mounting plate in circumferential alignment with said channel, a continuous series of circumferentially curved brake blocks movably contained in unconnected endwise abutting relation in said channel with the terminal blocks in said series arcuately spaced apart with ends in spaced opposed relation, a band encircling said series of brake blocks, a pair of leaf springs carried by said mounting plate having outer ends connected respectively to the opposite ends of said band, said springs being under tension to draw upon said band so that thereby the latter will normally maintain said series of brake blocks seated in said channel in retracted position out of frictional braking engagement with the braking surface of said drum, a rocking operating shaft journaled in said mounting plate and extending into the space within said drum parallel with the axis of rotation of the latter, an eccentric fixed upon the inner end portion of said shaft, an outwardly extending thrust link pivoted at its inner end upon said eccentric, and a pair of co-operating toggle links pivoted at their adjacent inner ends to the outer end of said thrust link and having their outer ends respectively in pivotal thrusting engagement with said terminal blocks thereby to expand said series of brake blocks radially into frictional braking engagement with the annular braking surface of said drum.

3. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks of said series spaced apart in opposed relation, stationary abutment means interposed between said spaced terminal blocks and forming thrust stops therefor, a retaining band encircling said series of brake blocks, spring means adapted to draw upon opposite ends of said band thereby to maintain said series of brake blocks normally seated in said channel in retracted position out of frictional braking engagement with the braking surface of said drum, and operating means adapted to apply a separating thrust to said terminal blocks and adapted to provide for each of said terminal blocks remaining stationary in abutting relation with its stop formed by said abutment means while the other said terminal block will be moved away from its stop formed by said abutment means by the frictional drag of said drum when the latter rotates so that thereby the frictional braking resistance will be automatically augmented throughout said continuous arcuate series of brake blocks irrespective of the direction of rotation of said drum.

4. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks of said series spaced apart in opposed relation, stationary abutment means interposed between said spaced terminal blocks and forming thrust stops therefor, a retaining band encircling said series of brake blocks, spring means adapted to draw upon opposite ends of said band thereby to maintain said series of brake blocks normally seated in said channel in retracted position out of frictional braking engagement with the braking surface of said drum, and operating means adapted to apply a separating thrust to said terminal blocks and adapted to provide for each of said terminal blocks remaining stationary in abutting relation with its stop formed by said abutment means while the other said terminal block will be moved away from its stop formed by said abutment means by the frictional drag of said drum when the latter rotates so that thereby the frictional braking resistance will be automatically augmented throughout said continuous arcuate series of brake blocks irrespective of the direction of rotation of said drum, the abutted ends of said brake blocks being shaped for complementary unconnected interengagement adapted to maintain their peripheral surfaces in circumferential alignment.

5. In a brake construction, in combination, a rotative brake drum having an internal annular braking surface, a stationary mounting plate concentric with said drum, a stationary peripherally open channel fixedly carried by said mounting plate and disposed inwardly from the annular braking surface of said drum, a stationary abutment block fixedly carried by said mounting plate in circumferential alignment with said channel, a continuous series of circumferentially curved brake blocks movably contained in unconnected endwise abutting relation in said channel with the terminal blocks in said series arcuately spaced apart with ends in spaced opposed relation, a band encircling said series of brake blocks, a pair of leaf springs carried by said mounting plate having outer ends connected respectively to the opposite ends of said band, said springs being under tension to draw upon said band so that thereby the latter will normally maintain said series of brake blocks seated in said channel in retracted position out of frictional braking engagement with the braking surface of said drum, a rocking operating shaft journaled in said mounting plate and extending into the space within said drum parallel with the axis of rotation of the latter, an eccentric fixed upon the inner end portion of said shaft, an outwardly extending thrust link pivoted at its inner end upon said eccentric, and a pair of co-operating toggle links pivoted at their adjacent inner ends to the outer end of said thrust link and having their outer ends respectively in pivotal thrusting engagement with said terminal blocks thereby to expand said series of brake blocks radially into frictional braking engagement with the annular braking surface of said drum, the abutted ends of said brake blocks being shaped for complementary unconnected interengagement adapted to maintain their peripheral surfaces in circumferential alignment.

6. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, a retaining band encircling said series of brake blocks, spring means adapted to draw upon opposite ends of said band thereby to maintain said series of brake blocks normally seated in said channel in retracted position out of frictional braking engagement with the braking surface of said drum, a rocking operating shaft parallel with the axis of rotation of said drum and extending into the space between the ends of said terminal blocks, said shaft having a longitudinal slot diametrically through it within said space, and a flat cam member having a sliding fit through said slot and of greater length transversely of said shaft then the diameter of the latter so as to have cam ends respectively in camming engagement with the opposed ends of said terminal blocks thereby to expand said series of brake blocks radially outward into frictional braking engagement with the annular braking surface of said drum and so that by reason of the free sliding movement of said cam member the rotation of said drum will automatically increase the frictional braking resistance of said blocks throughout the series thereof with the braking surface of said drum irrespective of the direction of rotation of said drum.

7. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, a retaining band encircling said series of brake blocks, spring means adapted to draw upon opposite ends of said band thereby to maintain said series of brake blocks normally seated in said channel in retracted position out of frictional braking engagement with the braking surface of said drum, a rocking operating shaft parallel with the axis of rotation of said drum and extending into the space between the ends of said terminal blocks, said shaft having a longitudinal slot diametrically through it within said space, and a flat cam member having a sliding fit through said slot and of greater length transversely of said shaft than the diameter of the latter so as to have cam ends respectively in camming engagement with the opposed ends of said terminal blocks thereby to expand said series of brake blocks radially outward into frictional braking engagement with the annular braking surface of said drum and so that by reason of the free sliding movement of said cam member the rotation of said drum will automatically increase the frictional braking resistance of said blocks throughout the series thereof with the braking surface of said drum irrespective of the direction of rotation of said drum, the abutted ends of said brake blocks being shaped for complementary unconnected interengagement adapted to maintain their peripheral surfaces in circumferential alignment.

8. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, a retaining band encircling said series of brake blocks, spring means adapted to draw upon opposite ends of said band thereby to maintain said series of brake blocks normally seated in said channel in retracted position out of frictional braking engagement with the braking surface of said drum, a rocking operating shaft parallel with the axis of rotation of said drum and extending into the space between the ends of said terminal blocks, a stationary abutment block carried by said shaft in the space between the opposed ends of said terminal blocks and forming thrust stops therefor, said abutment block having openings through its opposite sides and said shaft having a longitudinal slot diametrically through it communicating with said openings, and a flat cam member having a sliding fit through said slot with opposite cam ends projecting through the openings in said abutment block into camming engagement with the opposed ends of said terminal blocks thereby to expand said series of brake blocks radially outward into frictional braking engagement with the annular braking surface of said drum.

9. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, a retaining band encircling said series of brake blocks, spring means adapted to draw upon opposite ends of said band thereby to maintain said series of brake blocks normally seated in said channel in retracted position out of frictional braking engagement with the braking surface of said drum, a rocking operating shaft parallel with the axis of rotation of said drum and extending into the space between the ends of said terminal blocks, a stationary abutment block carried by said shaft in the space between the opposed ends of said terminal blocks and forming thrust stops therefor, said abutment block having openings through its opposite sides and said shaft having a longitudinal slot diametrically through it communicating with said openings, and a flat cam member having a sliding fit through said slot with opposite cam ends projecting through the openings in said abutment block into camming engagement with the opposed ends of said terminal blocks thereby to expand said series of brake blocks radially outward into frictional braking engagement with the annular braking surface of said drum, the abutted ends of said brake blocks being shaped for complementary unconnected interengagement adapted to maintain their peripheral surfaces in circumferential alignment.

10. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, stationary abutment means interposed between the spaced opposed ends of said terminal blocks and forming thrust stops therefor, a band encircling said series of brake blocks, spring means adapted to draw upon opposite ends of said band thereby to maintain said series of brake blocks normally seated in said channel in retracted position out of frictional braking engagement with the braking surface of said drum, and hydraulic operating means including a pair of pivoted links having their outer ends respectively in thrusting engagement with the spaced opposed ends of said terminal blocks thereby to expand said series of brake blocks radially outward into frictional braking engagement with the annular braking surface of said drum, and operating means for said links adapted to provide for the independent movement of each of said terminal blocks away from its stop formed by said abutment means while the other said terminal block remains stationary in abutting relation with its stop formed by said abutment means so that thereby the rotation of said drum will automatically increase the frictional braking resistance of said blocks throughout the series thereof with the braking surface of said drum irrespective of the direction of rotation of said drum.

11. In a brake construction, in combination, a rotative brake drum having an internal annular braking surface, a stationary arcuate peripherally open channel disposed inwardly from the annular braking surface of said drum, a continuous arcuate series of circumferentially curved brake blocks movably contained in unconnected endwise abutting relation in said channel with the terminal blocks in said series arcuately spaced apart with ends in spaced opposed relation, stationary abutment means interposed between the spaced opposed ends of said terminal blocks and forming thrusts stops therefor, a band encircling said series of brake blocks, spring means adapted to draw upon opposite ends of said band thereby to maintain said series of brake blocks normally seated in said channel in retracted position out of frictional braking engagement with the braking surface of said drum, and hydraulic operating means including a pair of pivoted links having their outer ends respectively in thrusting engagement with the spaced opposed ends of said terminal blocks thereby to expand said series of brake blocks radially outward into frictional braking engagement with the annular braking surface of said drum, and operating means for said links adapted to provide for the independent movement of each of said terminal blocks away from its stop formed by said abutment means while the other said block remains stationary in abutting relation with its stop formed by said abutment means so that thereby the rotation of said drum will automatically increase the frictional braking resistance of said blocks throughout the series thereof with the braking surface of said drum irrespective of the direction of rotation of said drum, the abutted ends of said brake blocks being shaped for complementary unconnected interengagement adapted to maintain their peripheral surfaces in circumferential alignment.

12. In a brake construction, in combination, a rotative brake drum having an internal annular braking surface, a stationary arcuate peripherally open channel disposed inwardly from the annular braking surface of said drum, a continuously arcuate series of circumferentially curved brake blocks movably contained in unconnected endwise abutting relation in said channel with the terminal blocks in said series arcuately spaced apart with ends in spaced opposed relation, a stationary abutment block interposed between the spaced opposed ends of said terminal blocks and forming thrust stops therefor, a retaining band encircling said series of brake blocks, spring means adapted to draw upon opposite ends of said band thereby to maintain said series of brake blocks normally seated in said channel in retracted position out of frictional braking engagement with the braking surface of said drum, and hydraulic operating means for said series of brake blocks comprising a radially disposed hydraulic cylinder having an outwardly extending piston rod, an outwardly extending thrust link pivoted at its inner end to said piston rod, and a pair of co-operating toggle links pivoted at their adjacent inner ends to the outer end of said thrust link and having their outer ends respectively in pivotal thrusting engagement with the spaced opposed ends of said terminal blocks thereby to expand said series of brake blocks radially outward into frictional braking engagement with the annular braking surface of said drum and so that by reason of said pivoted thrust link and the freedom of movement of each of said terminal blocks the rotation of said drum will increase the frictional braking resistance of said blocks throughout the series thereof with the braking surface of said drum irrespective of the direction of rotation of said drum.

13. In a brake construction, in combination, a rotative brake drum having an internal annular braking surface, a stationary arcuate peripherally open channel disposed inwardly from the annular braking surface of said drum, a continuously arcuate series of circumferentially curved brake blocks movably contained in unconnected endwise abutting relation in said channel with the terminal blocks in said series arcuately spaced apart with ends in spaced opposed relation, a stationary abutment block interposed between the spaced opposed ends of said terminal blocks and forming thrust stops therefor, a retaining band encircling said series of brake blocks, spring means adapted to draw upon opposite ends of said band thereby to maintain said series of brake blocks normally seated in said channel in retracted position out of frictional braking engagement with the braking surface of said drum, and hydraulic operating means for said series of brake blocks comprising a radially disposed hydraulic cylinder having an outwardly extending piston rod, an outwardly extending thrust link pivoted at its inner end to said piston rod, and a pair of co-operating toggle links pivoted at their adjacent inner ends to the outer end of said thrust link and having their outer ends respectively in pivotal thrusting engagement with the spaced opposed ends of said terminal blocks thereby to expand said series of brake blocks radially outward into frictional braking engagement with the annular braking surface of said drum and so that by reason of said pivoted thrust link and the freedom of movement of each of said terminal blocks the rotation of said drum will increase the frictional braking resistance of said blocks throughout the series thereof with the braking surface of said drum irrespective of the direction of rotation of said drum, the abutted ends of said brake blocks being shaped for complementary unconnected interengagement adapted to maintain their peripheral surfaces in circumferential alignment.

14. In a brake construction, in combination, a rotative brake drum having an internal annular braking surface, a continuous arcuate series of brake blocks having circumferentially curved peripheries and disposed in unconnected endwise abutting relation with the terminal blocks in said series arcuately spaced apart with ends in spaced opposed relation, means adapted to retain and guide said series of brake blocks inwardly of the annular braking surface of said drum, a continuous facing strip of braking material encircling the peripheries of said brake blocks throughout said series thereof and secured to each individual brake block in said series thereof, and operating means adapted to thrust in opposite arcuate directions against said terminal blocks thereby to expand said series of brake blocks radially outward thus bringing said facing strip into frictional braking engagement with the annular braking surface of said drum.

15. In a brake construction, in combination, a brake drum having an internal annular braking surface, an arcuate peripherally open channel disposed inwardly from the braking surface of said drum, an arcuate series of circumferentially curved brake blocks movably contained in unconnected endwise abutting relation in said channel with the terminal blocks of said series spaced apart, abutment means interposed between said spaced terminal blocks and adapted to form a thrust-receiving backing stop for one of the terminal blocks in said series, a retaining band encircling said series of blocks, spring means adapted to draw upon opposite ends of said band thereby to maintain said series of blocks normally seated in said channel in retracted position out of braking engagement with the braking surface of said drum, and operating means adapted to thrust the other terminal block toward said abutment means along the arc occupied by said brake blocks thereby to expand said series of blocks radially outward into braking engagement with the braking surface of said drum, the abutted ends of said blocks being shaped for complementary unconnected interengagement adapted to maintain their peripheral surfaces in circumferential alignment.

16. In a brake construction, in combination, a brake drum having an internal annular braking surface, an arcuate peripherally open channel disposed inwardly from the braking surface of said drum, an arcuate series of circumferentially curved brake blocks movably contained in unconnected endwise abutting relation in said channel and having terminal blocks spaced apart, abutment means interposed between said spaced terminal blocks and adapted to form a thrust-receiving backing stop for one of the terminal blocks in said series, a retaining band encircling said series of blocks, spring means adapted to draw upon opposite ends of said band thereby to maintain said series of blocks normally seated in said channel in retracted position out of braking engagement with the braking surface of said drum, and operating means capable of causing abutment of said brake blocks upon said braking surface, the abutted ends of said brake blocks having male and female interengagement adapted to maintain them in circumferential alignment.

17. In a brake construction, in combination, a brake drum having an internal annular braking surface, an arcuate peripherally open channel disposed inwardly from the braking surface of said drum, an arcuate series of circumferentially curved brake blocks movably contained and guided in unconnected endwise opposed relation in said channel and having terminal blocks spaced apart, abutting means forming an unconnected aligning engagement between the opposed ends of said brake blocks in said series adapted to maintain said brake blocks in circumferential alignment, abutment means interposed between said spaced terminal blocks and adapted to form a thrust-receiving backing stop for one of the terminal blocks in said series, a retaining band encircling said series of blocks, spring means adapted to draw upon opposite ends of said band thereby to maintain said series of blocks normally seated in said channel in retracted position out of braking engagement with the braking surface of said drum, and operating means adapted to thrust the other terminal block toward said abutment means along the arc occupied by said brake blocks thereby to expand said series of blocks radially outward into braking engagement with the braking surface of said drum.

18. In a brake construction, in combination, a brake drum having an internal annular braking surface, an arcuate peripherally open channel disposed inwardly from the braking surface of said drum, an arcuate series of circumferentially curved brake blocks movably contained in unconnected endwise abutting relation in said channel and having terminal blocks spaced apart, abutment means interposed between said spaced terminal blocks and adapted to form a thrust-receiving backing stop for one of the terminal blocks in said series, a retaining band encircling said series of blocks, spring means adapted to draw upon opposite ends of said band thereby to maintain said series of blocks normally seated in said channel in retracted position out of braking engagement with the braking surface of said drum, and operating means capable of causing abutment of said brake blocks upon said braking surface.

19. In a brake construction, in combination, a brake drum having an internal annular braking surface, an arcuate peripherally open channel disposed inwardly from the braking surface of said drum, an arcuate series of circumferentially curved brake blocks movably contained in unconnected endwise abutting relation in said channel and having terminal blocks spaced apart, abutment means interposed between said spaced terminal blocks and adapted to form a thrust-receiving backing stop for one of the terminal blocks in said series, a flexible tensile element common to all of and having engagement with each of said blocks, spring means adapted to draw upon and tension said element thereby to maintain said series of blocks normally seated in said channel in retracted position out of braking engagement with the braking surface of said drum, and operating means capable of causing abutment of said brake blocks upon said braking surface.

FRANK C. REILLY.
JOSEPH W. JONES.